(12) United States Patent
Ichikawa

(10) Patent No.: US 8,866,437 B2
(45) Date of Patent: Oct. 21, 2014

(54) ELECTRIC-POWERED VEHICLE

(75) Inventor: Shinji Ichikawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 448 days.

(21) Appl. No.: 13/376,820

(22) PCT Filed: Jul. 3, 2009

(86) PCT No.: PCT/JP2009/062211
§ 371 (c)(1),
(2), (4) Date: Dec. 7, 2011

(87) PCT Pub. No.: WO2011/001534
PCT Pub. Date: Jan. 6, 2011

(65) Prior Publication Data
US 2012/0086267 A1 Apr. 12, 2012

(51) Int. Cl.
*H02J 7/00* (2006.01)
*B60L 11/12* (2006.01)
*B60L 11/18* (2006.01)
*B60K 6/365* (2007.10)
*B60K 6/445* (2007.10)
*B60L 11/14* (2006.01)
*B60K 1/02* (2006.01)

(52) U.S. Cl.
CPC ............... *B60K 6/365* (2013.01); *Y02T 90/14* (2013.01); *B60L 11/123* (2013.01); *B60L 2250/16* (2013.01); *Y02T 10/7077* (2013.01); *B60L 11/1818* (2013.01); *Y02T 10/7241* (2013.01); *Y02T 90/163* (2013.01); *Y02T 10/6269* (2013.01); *B60K 1/02* (2013.01); *B60L 2230/12* (2013.01); *Y02T 90/127* (2013.01); *Y02T 10/7088* (2013.01); *B60K 6/445* (2013.01); *Y02T 10/7005* (2013.01); *Y02T 90/121* (2013.01); *B60L 2210/40* (2013.01); *Y02T 10/6239* (2013.01); *Y02T 90/169* (2013.01); *Y02T 10/6217* (2013.01); *B60L 11/1846* (2013.01); *Y04S 30/14* (2013.01); *B60L 2220/14* (2013.01); *Y02T 90/128* (2013.01); *B60W 2540/10* (2013.01); *B60L 11/14* (2013.01)
USPC .......................................... 320/104; 320/109

(58) Field of Classification Search
CPC ... Y02T 10/7005; Y02T 90/14; Y02T 10/705; Y02T 10/7088; Y02E 60/12; A47K 10/36; B60R 2022/4666; B60R 22/46; B60R 2022/4473; B60R 2022/468; B60R 22/44; B60R 2022/4685; B60R 22/4676; B60R 2021/01
USPC ........................................................ 320/104
See application file for complete search history.

(56) References Cited

U.S. PATENT DOCUMENTS 5,306,999 A * 4/1994 Hoffman ....................... 320/109
5,413,493 A * 5/1995 Hoffman ....................... 439/188
(Continued)

FOREIGN PATENT DOCUMENTS

| JP | 8-228406 A | 9/1996 |
| JP | 11-299008 A | 10/1999 |
| JP | 2003244832 A | 8/2003 |
| JP | 2009-100569 A | 5/2009 |
| WO | 9710967 A1 | 3/1997 |
| WO | 2008-143155 A1 | 11/2008 |

*Primary Examiner* — Arun Williams
(74) *Attorney, Agent, or Firm* — Gifford, Krass, Sprinkle, Anderson & Citkowski, P.C.

(57) ABSTRACT

A power receiving port includes an inlet, a pullout hole for a pullout type cord, and a selector switch. Inlet is connectable with a charging cable provided outside a vehicle. Pullout type cord is pulled out from pullout hole so as to be connectable to a socket of a power source outside the vehicle. In power receiving port, pullout hole is provided at a position where a distance between the pullout hole and a joint openably combining a lid with power receiving port is more than a distance between the inlet and the joint. Selector switch is to select whether to use inlet or pullout type cord by a user.

8 Claims, 13 Drawing Sheets

(56) References Cited

U.S. PATENT DOCUMENTS

| | | | |
|---|---|---|---|
| 5,757,595 A * | 5/1998 | Ozawa et al. | 340/636.1 |
| 5,931,245 A | 8/1999 | Uetake et al. | |
| 6,264,016 B1 * | 7/2001 | Bales | 191/12.4 |
| 6,854,575 B1 * | 2/2005 | Desormeaux et al. | 191/12.4 |
| 6,892,840 B2 * | 5/2005 | Meaney, Jr. | 180/65.22 |
| 7,688,024 B2 * | 3/2010 | Kamaga | 320/104 |
| 8,125,180 B2 * | 2/2012 | Grider et al. | 320/104 |
| 8,378,628 B2 * | 2/2013 | Ichikawa et al. | 320/109 |
| 2010/0013433 A1 * | 1/2010 | Baxter et al. | 320/109 |
| 2011/0193521 A1 * | 8/2011 | Ichikawa | 320/109 |

* cited by examiner

ELECTRIC-POWERED VEHICLE

TECHNICAL FIELD

This invention relates to an electric-powered vehicle, particularly to an electric-powered vehicle having a rechargeable power storage device chargeable from a power source outside the vehicle.

BACKGROUND ART

An electric-powered vehicle such as an electric vehicle, a hybrid vehicle and a fuel cell vehicle largely draws public attention as an eco-friendly vehicle. The electric-powered vehicle is equipped with an electric motor for generating traveling drive force, and a power storage device storing electric power to be supplied to the electric motor. The hybrid vehicle is a vehicle further equipped with an internal combustion engine as a power source, and the fuel cell vehicle is a vehicle equipped with a fuel cell as a DC power source.

With regard to the hybrid vehicle, there is a known vehicle having a power storage device equipped in the vehicle for driving the vehicle so as to be chargeable from a power source outside the vehicle. For example, a charging cord is connected to a power supply socket provided in a building or a charging cable is connected to a charging inlet so as to supply the electric power from the power source outside the vehicle to the power storage device. Hereinafter, the electric-powered vehicle having the power storage device equipped in the vehicle so as to be chargeable from the power source outside the vehicle is also called as a "plug-in vehicle".

Japanese Patent Laying-Open No. 2003-244832 (PTL 1) discloses such a plug-in vehicle (an electric vehicle). In this vehicle, a wind-up type cord is used as a cord for charging a battery connectable to a power supply socket for household use. When a state of wind-up of the cord is determined and it is determined that the cord is wound up, charging of the battery via the cord is inhibited (refer to PTL 1).

CITATION LIST

Patent Literature

PTL 1: Japanese Patent Laying-Open No. 2003-244832
PTL 2: Japanese Patent Laying-Open No. 8-228406

SUMMARY OF INVENTION

Technical Problem

As a method of receiving electric power from a power source outside a vehicle, a cord equipped in the vehicle as disclosed in Patent Literature above is connected to a socket for household use, or in addition, as well as a case of oil filling, there may be a method that an exclusive charging cable provided outside the vehicle is connected to a power receiving inlet of the vehicle. Desirably, a power receiving cord connectable to the power supply socket for household use and a power receiving inlet connectable with the exclusive charging cable are provided in the vehicle and selectively used. However, in a case where both the power receiving cord and the power receiving inlet are provided in the vehicle as described above, the power receiving cord and the power receiving inlet are not only simply provided but convenience at the time of using the cord and the inlet needs to be sufficiently considered.

Therefore, an object of this invention is to provide an electric-powered vehicle provided with a power receiving cord connectable to a power supply socket outside the vehicle, and a power receiving inlet connectable with a charging cable outside the vehicle in consideration with convenience at the time of using the cord and the inlet.

Solution To Problem

According to this invention, the electric-powered vehicle is an electric-powered vehicle having a rechargeable power storage device chargeable from a power source outside the vehicle, including a power receiving inlet, a pullout type power receiving cord, a power receiving port, and a lid of the power receiving port. The power receiving inlet is connectable with a charging cable provided outside the vehicle. The power receiving cord is connectable to a socket of the power source. The power receiving port has the power receiving inlet and a pullout hole for the power receiving cord formed thereon. Here, in the power receiving port, the pullout hole is provided at a position where a distance between the pullout hole and a joint openably combining the lid with the power receiving port is more than a distance between the power receiving inlet and the joint.

Preferably, the power receiving inlet and the pullout hole are respectively provided on the side where the joint is provided and the side opposing to the side where the joint is provided in the power receiving port.

Preferably, the power receiving cord or the power receiving inlet is selectively used at the time of charging the power storage device from the power source outside the vehicle.

Further preferably, the electric-powered vehicle is further provided with a switch. The switch is to select whether to use the power receiving inlet or the power receiving cord at the time of charging the power storage device from the power source outside the vehicle.

Further preferably, the switch is provided in the power receiving port.

Preferably, the electric-powered vehicle is further provided with a voltage sensor and a determiner. The voltage sensor detects voltage of the power receiving cord. The determiner determines whether to use the power receiving inlet or the power receiving cord at the time of charging the power storage device from the power source outside the vehicle based on a detected value of the voltage sensor and a connection signal indicating connection between the charging cable and the power receiving inlet.

Preferably, the electric-powered vehicle is further provided with a detector, and a determiner. The detector detects pullout of the power receiving cord from the pullout hole. The determiner determines whether to use the power receiving inlet or the power receiving cord at the time of charging the power storage device from the power source outside the vehicle based on a detection result of the detector and a connection signal indicating connection between the charging cable and the power receiving inlet.

Preferably, the electric-powered vehicle is further provided with a display. The display displays whether the power receiving inlet or the power receiving cord is being used.

Advantageous Effects of Invention

In this invention, the power receiving inlet connectable with the charging cable provided outside the vehicle and the pullout hole for the power receiving cord are provided in the power receiving port. In the power receiving port, the pullout hole is provided at the position where the distance between the pullout hole and the joint openably combining the power receiving port with the lid is more than the distance between the power receiving inlet and the joint. Thus, the lid is not disturbing when the power receiving cord is pulled out from the pullout hole. Therefore, according to this invention, the power receiving cord is easily pulled out so as to improve convenience.

DESCRIPTION OF EMBODIMENTS

Figure 1:
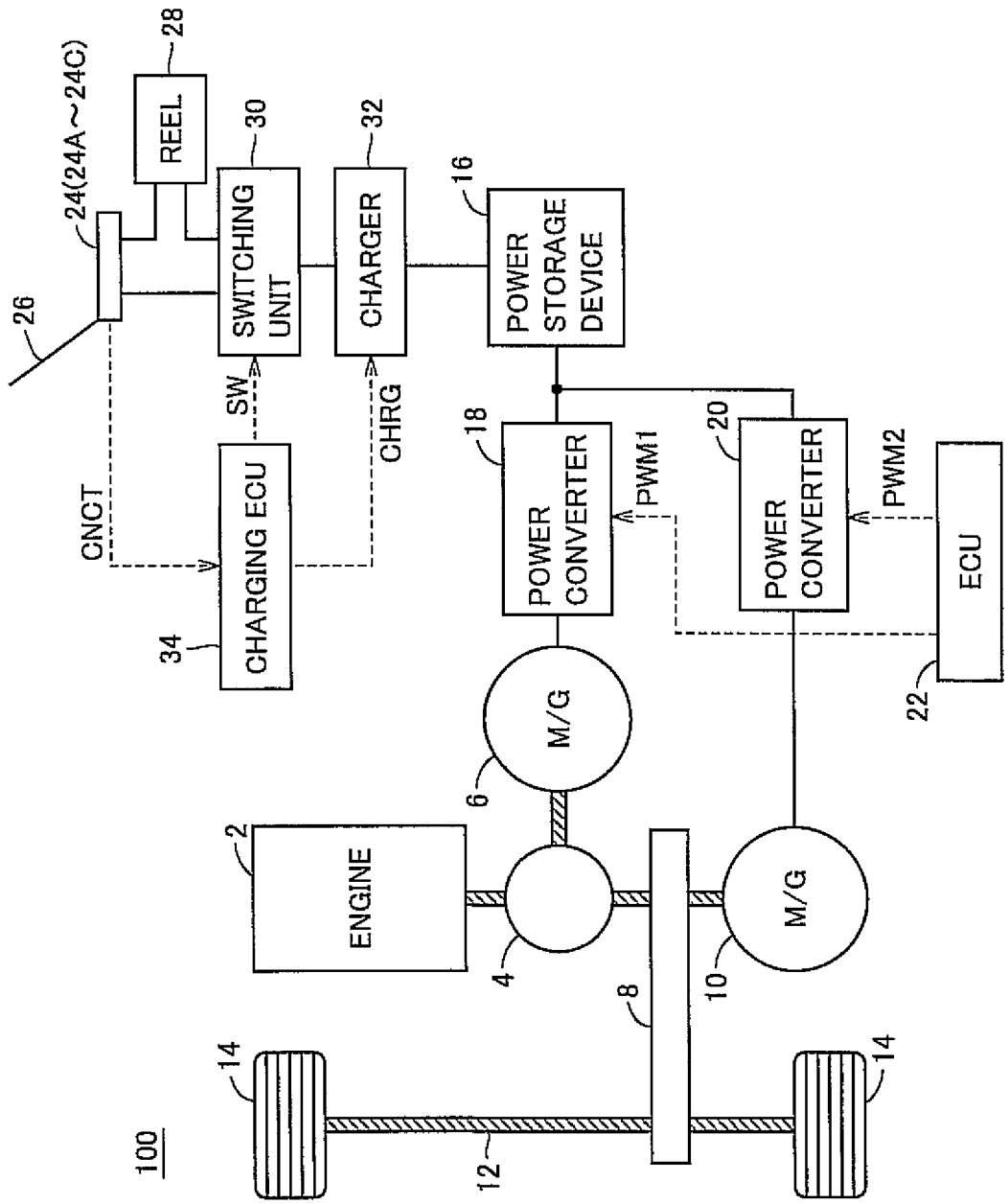
FIG. 1 is an entire block diagram of a hybrid vehicle shown as an example of an electric-powered vehicle according to an embodiment of this invention.

Hereinafter, embodiments of the present invention will be described in detail with reference to the drawings. It should be noted that the same parts or corresponding parts in the drawings are given the same reference numerals and description of the parts will not be repeated.

[First Embodiment]

FIG. 1 is an entire block diagram of a hybrid vehicle shown as an example of an electric-powered vehicle according to a first embodiment of this invention. With reference to FIG. 1, a hybrid vehicle 100 is provided with an engine 2, a power split device 4, motor generators 6 and 10, a transmission gear 8, a drive shaft 12 and wheels 14. Hybrid vehicle 100 is further provided with a power storage device 16, power converters 18 and 20, and an ECU (Electronic Control Unit) 22. Hybrid vehicle 100 is further provided with a power receiving port 24, a lid 26, a cord reel 28, a switching unit 30, a charger 32, and a charging ECU 34.

Power storage device 16 is a rechargeable DC power source, and for example made of a nickel hydride secondary battery, a lithium ion secondary battery or the like. Power storage device 16 supplies electric power to power converters 18 and 20. Power storage device 16 is charged with the electric power from power converter 18 and/or 20 when generating the electric power in motor generator 6 and/or 10. Further, power storage device 16 is charged with the electric power input from power receiving port 24 when charged from a power source (not shown) outside the vehicle (hereinafter, also referred to as the "outside power source"). It should be noted that a capacitor can be adapted as power storage device 16. Any electric buffer capable of temporarily storing the electric power generated by motor generators 6 and 10 and the electric power from the outside power source and supplying the stored electric power to motor generators 6 and 10 can be adapted as power storage device 16.

Power converter 18 converts the electric power generated by motor generator 6 into DC electric power based on a signal PWM1 from ECU 22, and outputs the power to power storage device 16. Power converter 20 converts the DC electric power supplied from power storage device 16 into AC electric power based on a signal PWM2 from ECU 22, and outputs the power to motor generator 10. It should be noted that power converter 18 converts the DC electric power supplied from power storage device 16 into the AC electric power based on signal PWM1 at the time of starting up engine 2, and outputs the power to motor generator 6. Power converter 20 converts the electric power generated by motor generator 10 into the DC electric power based on signal PWM2 at the time of braking the vehicle or reducing an accelerated rate on a down sloping surface, and outputs the power to power storage device 16.

Motor generator 6 and 10 are an AC electric motor and for example each formed by a three phase AC synchronous electric motor with a permanent magnet buried in a rotor. Motor generator 6 converts motion energy generated by engine 2 into electric energy, and outputs the energy to power converter 18. Motor generator 6 generates drive force by three phase AC electric power received from power converter 18, and starts up engine 2.

Motor generator 10 generates drive torque of the vehicle by the three phase AC electric power received from power converter 20. Motor generator 10 converts dynamic energy stored in the vehicle as the motion energy or potential energy into the electric energy at the time of braking the vehicle or reducing the accelerated rate on the down sloping surface, and outputs the energy to power converter 20.

Engine 2 converts thermal energy generated by combustion of fuel into the motion energy of a motion element such as a piston and the rotor, and outputs the converted motion energy to power split device 4. For example, when the motion element is the piston and motion thereof is reciprocating motion, the reciprocating motion is converted into rotational motion via a so-called crank mechanism and the motion energy of the piston is transmitted to power split device 4.

Power split device 4 is combined with engine 2, motor generator 6 and transmission gear 8 so as to split mechanical power between the elements above. For example, a planetary gear having three rotation shafts of a sun gear, a planetary carrier and a ring gear can be used as power split device 4. The three rotation shafts are connected to rotation shafts of motor generator 6, engine 2 and transmission gear 8, respectively. A rotation shaft of motor generator 10 is coupled to the rotation shaft of transmission gear 8. That is, motor generator 10 and transmission gear 8 have an identical rotation shaft, and the rotation shaft is connected to the ring gear of power split device 4.

The motion energy generated by engine 2 is split into motor generator 6 and transmission gear 8 by power split device 4. That is, engine 2 is assembled in hybrid vehicle 100 as a power source for driving transmission gear 8 for transmitting the mechanical power to drive shaft 12 and also driving motor generator 6. Motor generator 6 is assembled in hybrid vehicle 100 so as to be operated as a power generator driven by engine 2 and also as an electric motor capable of starting up engine 2. Motor generator 10 is assembled in hybrid vehicle 100 as a power source for driving transmission gear 8 for transmitting the mechanical power to drive shaft 12.

ECU 22 generates signals PWM1 and PWM2 for driving power converters 18 and 20, respectively, and outputs generated signals PWM1 and PWM2 to power converters 18 and 20, respectively.

Power receiving port 24 is a power interface receiving the electric power supplied from the outside power source, and for example made by forming a concave part on an outer surface of the vehicle as well as conventional fuel filler. Power receiving port 24 is provided with an inlet connectable with a charging cable provided outside the vehicle, and a pullout hole for a pullout type cord connectable to a socket of the outside power source (will be described later). In hybrid vehicle 100, as a method of receiving the electric power supplied from the outside power source, it is possible to select either a method of connecting the charging cable provided outside the vehicle to the inlet of power receiving port 24, or a method of pulling out the pullout type cord from power receiving port 24 and connecting the cord to the socket of the outside power source. It should be noted that when the charging cable is connected to the inlet of power receiving port 24, a connection signal CNCT to be output from the inlet to charging ECU 34 is activated. An arrangement of power receiving port 24 will be described later in detail.

Lid 26 is a cover of power receiving port 24, and openably combined with power receiving port 24 by a joint such as a hinge (not shown). Cord reel 28 is a reel of the pullout type cord. Switching unit 30 is to electrically connect one of the inlet of power receiving port 24 and the pullout type cord to charger 32 and electrically separate the other from charger 32 based on a switching signal SW received from charging ECU 34. Charger 32 converts the electric power from the outside power source received from switching unit 30 into a voltage level of power storage device 16 based on a signal CHRG from charging ECU 34, and outputs the power to power storage device 16.

Charging ECU 34 receives connection signal CNCT from the inlet of power receiving port 24. Charging ECU 34 generates switching signal SW for controlling switching unit 30, and outputs generated switching signal SW to switching unit 30. Further, charging ECU 34 generates signal CHRG for driving charger 32, and outputs generated signal CHRG to charger 32.

Figure 2:
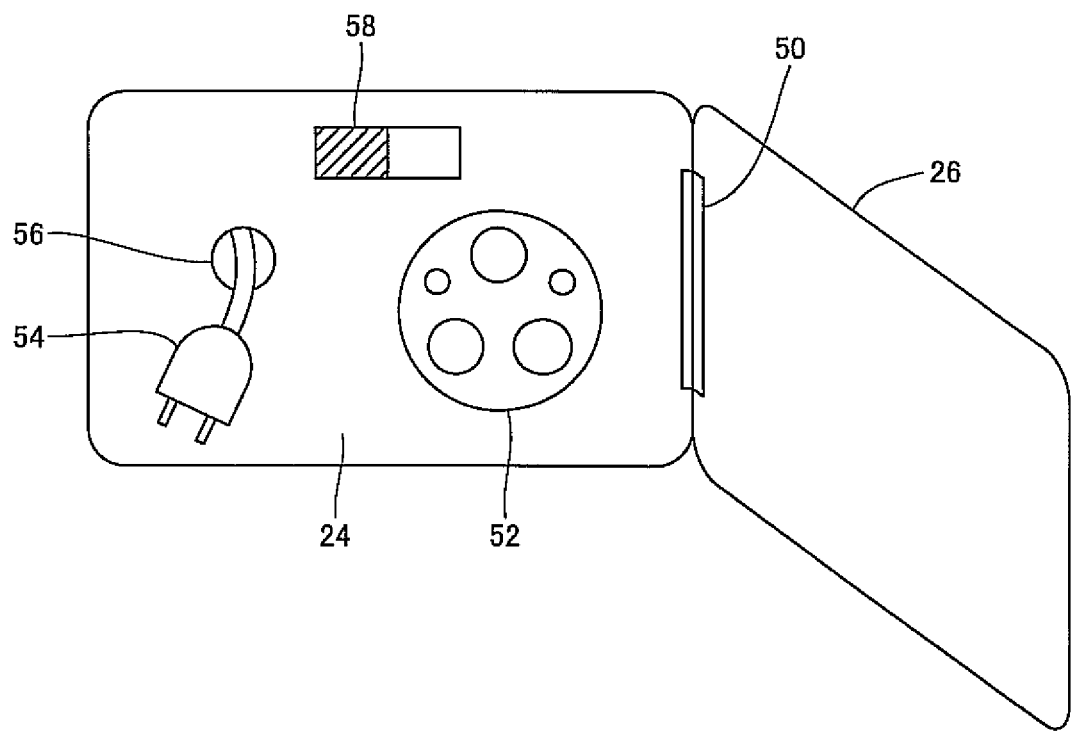
FIG. 2 is a diagram showing a schematic arrangement of a power receiving port and a lid shown in FIG. 1.

FIG. 2 is a diagram showing a schematic arrangement of power receiving port 24 and lid 26 shown in FIG. 1. With reference to FIG. 2, lid 26 is openably combined with power receiving port 24 by a joint 50 such as a hinge. As shown in FIG. 2, as an example, lid 26 is attached to power receiving port 24 by joint 50 so as to open to the right.

Power receiving port 24 is provided with an inlet 52, a pullout hole 56 for a pullout type cord 54, and a selector switch 58. Inlet 52 is connectable with the charging cable (not shown) provided outside the vehicle. It should be noted that when the charging cable is connected to inlet 52, connection signal CNCT to be output to charging ECU 34 (not shown) is activated.

Pullout hole 56 for pullout type cord 54 is provided at a position where a distance between the pullout hole 56 and joint 50 is more than a distance between inlet 52 and joint 50 in power receiving port 24. In other words, inlet 52 and pullout hole 56 are respectively provided on the side where joint 50 is provided (the non-opening side of lid 26) and the side opposing to the side where joint 50 is provided (the opening side of lid 26) in power receiving port 24.

In FIG. 2, as an example, joint 50 is provided in a right side of power receiving port 24. In this case, inlet 52 is provided on the right side (the side close to joint 50) in power receiving port 24, and pullout hole 56 is provided on the left side (the side distant from joint 50) in power receiving port 24. Since inlet 52 and pullout hole 56 are arranged in power receiving port 24 as described above, lid 26 is not disturbing when pullout type cord 54 is pulled out from pullout hole 56.

Selector switch 58 is to select whether to use inlet 52 or pullout type cord 54 at the time of charging power storage device 16 (FIG. 1) from the outside power source. Selector switch 58 is provided in power receiving port 24 so that a user can switch whether to use inlet 52 or pullout type cord 54 on the site. When selector switch 58 is on the side of inlet 52, inlet 52 can be used for charging power storage device 16 from the outside power source. When selector switch 58 is on the side of pullout hole 56, pullout type cord 54 can be used for charging power storage device 16 from the outside power source.

Figure 3:
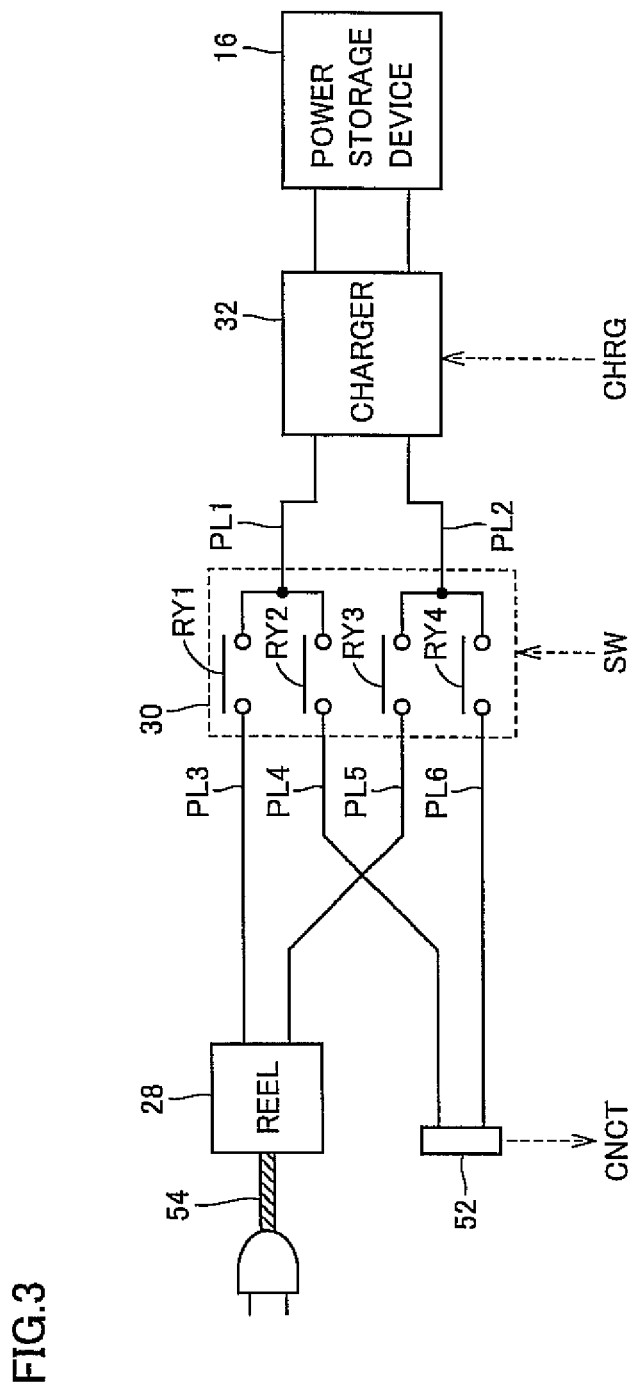
FIG. 3 is a diagram showing an arrangement of a charging route from the power receiving port to a power storage device.

FIG. 3 is a diagram showing an arrangement of a charging route from power receiving port 24 to power storage device 16. With reference to FIG. 3, switching unit 30 includes relays RY1 to RY4. Relay RY1 is provided between a power line PL1 to be connected to charger 32 and a power line PL3 to be connected to cord reel 28 of pullout type cord 54. Relay RY2 is provided between power line PL1 and a power line PL4 to be connected to inlet 52. Relay RY3 is provided between a power line PL2 to be connected to charger 32 and a power line PL5 to be connected to cord reel 28. Relay RY4 is provided between power line PL2 and a power line PL6 to be connected to inlet 52.

When switching signal SW received from charging ECU 34 (not shown) is activated, relays RY2 and RY4 are turned ON so that inlet 52 is electrically connected to charger 32, and relays RY1 and RY3 are turned OFF so that pullout type cord 54 is electrically separated from charger 32. Meanwhile, when switching signal SW is deactivated, relays RY1 and RY3 are turned ON so that pullout type cord 54 is electrically connected to charger 32, and relays RY2 and RY4 are turned OFF so that inlet 52 is electrically separated from charger 32.

Figure 4:
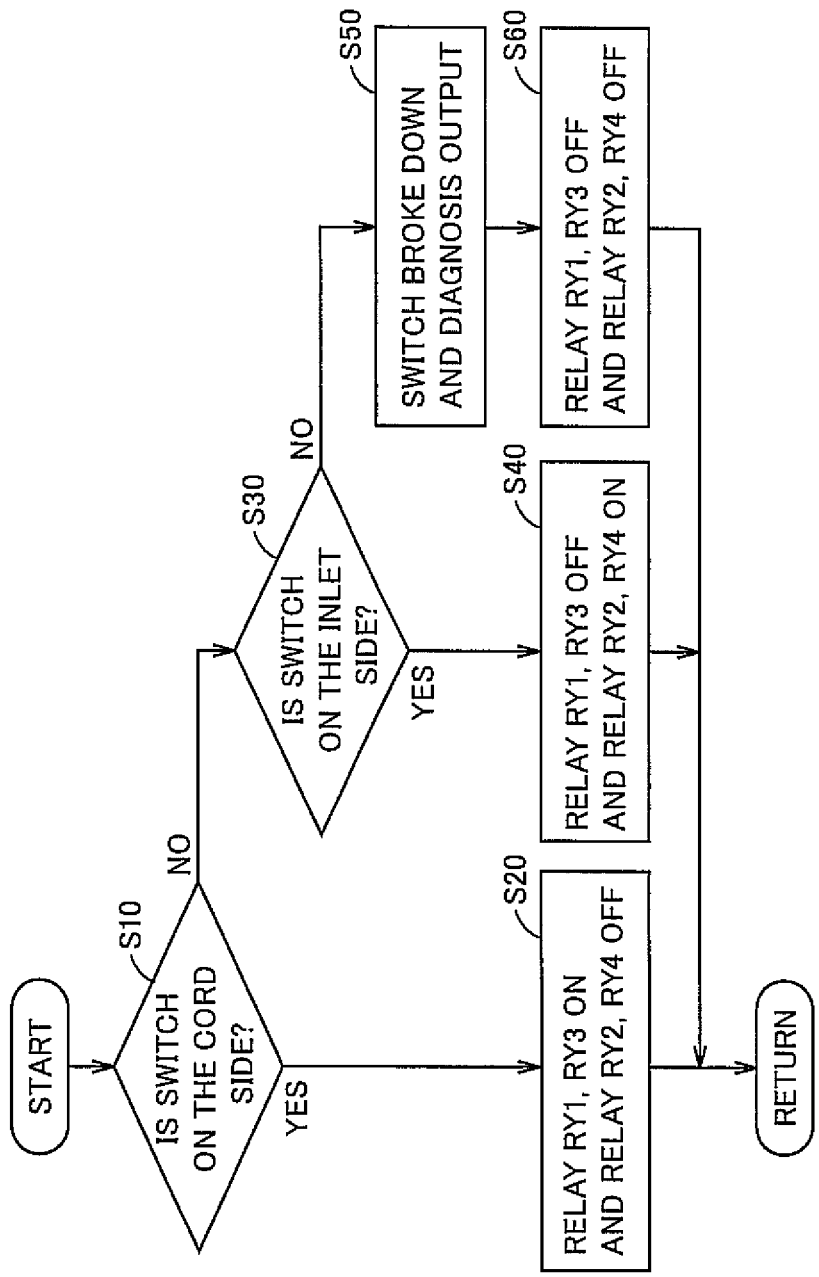
FIG. 4 is a flowchart for illustrating processing order of a charging ECU regarding switching of use between an inlet and a pullout type cord.

FIG. 4 is a flowchart for illustrating processing order of charging ECU 34 regarding switching of use between inlet 52 and pullout type cord 54. It should be noted that processing of this flowchart is called from a main routine and executed at the fixed interval or at every time when a predetermined condition is satisfied.

With reference to FIG. 4, charging ECU 34 determines whether or not selector switch 58 (FIG. 2) is on the side of pullout type cord 54 (the side of pullout hole 56) (Step S10). When it is determined that selector switch 58 is on the side of pullout type cord 54 (YES in Step S10), charging ECU 34 deactivates switching signal SW to be output to switching unit 30 so as to turn relays RY1 and RY3 of switching unit 30 ON and turn relays RY2 and RY4 OFF (Step S20). Thereby, pullout type cord 54 is electrically connected to charger 32 by switching unit 30.

Meanwhile, when it is determined that selector switch 58 is not on the side of pullout type cord 54 in Step S10 (NO in Step S10), charging ECU 34 determines whether or not selector switch 58 is on the side of inlet 52 (Step S30). When it is determined that selector switch 58 is on the side of inlet 52 (YES in Step S30), charging ECU 34 activates switching signal SW to be output to switching unit 30 so as to turn relays RY1 and RY3 of switching unit 30 OFF and turn relays RY2 and RY4 ON (Step S40). Thereby, inlet 52 is electrically connected to charger 32 by switching unit 30.

It should be noted that when it is determined that selector switch 58 is not on the side of inlet 52 in Step S30 (NO in Step S30), it is determined that selector switch 58 broke down and a diagnosis is output (Step S50). A signal to turn relays RY1 to RY4 OFF is output from charging ECU 34 to switching unit 30 so that relays RY1 to RY4 are turned OFF (Step S60).

It should be noted that although selector switch 58 is provided in power receiving port 24 above, selector switch 58 may be provided around an operator seat in vehicle interior concerning a switch operation in power receiving port 24 by the user.

As described above, in the first embodiment, inlet 52 connectable with the charging cable provided outside the vehicle and pullout hole 56 for pullout type cord 54 are provided in power receiving port 24. In power receiving port 24, pullout hole 56 is provided at the position where the distance between the pullout hole and joint 50 openably combining power receiving port 24 with lid 26 is more than the distance between inlet 52 and joint 50. More specifically, inlet 52 and pullout hole 56 are respectively provided on the side where joint 50 is provided (the non-opening side of lid 26) and the side opposing to the side where joint 50 is provided (the opening side of lid 26) in power receiving port 24. Thus, lid 26 is not disturbing when pullout type cord 54 is pulled out from pullout hole 56. Therefore, according to the first embodiment, pullout type cord 54 is easily pulled out so as to improve convenience.

According to the first embodiment, selector switch 58 to select whether to use inlet 52 or pullout type cord 54 at the time of charging power storage device 16 from the outside power source is provided. Thus, it is possible to properly select a charging method desired by the user. Since selector switch 58 is provided in power receiving port 24, the user can switch whether to use inlet 52 or pullout type cord 54 on the site.

[Second Embodiment]

In the first embodiment, selector switch 58 to select whether to use inlet 52 or pullout type cord 54 at the time of charging power storage device 16 (FIG. 1) from the outside power source is provided. However, in a second embodiment, selector switch 58 is not required and it is automatically determined whether to use inlet 52 or pullout type cord 54.

Figure 5:
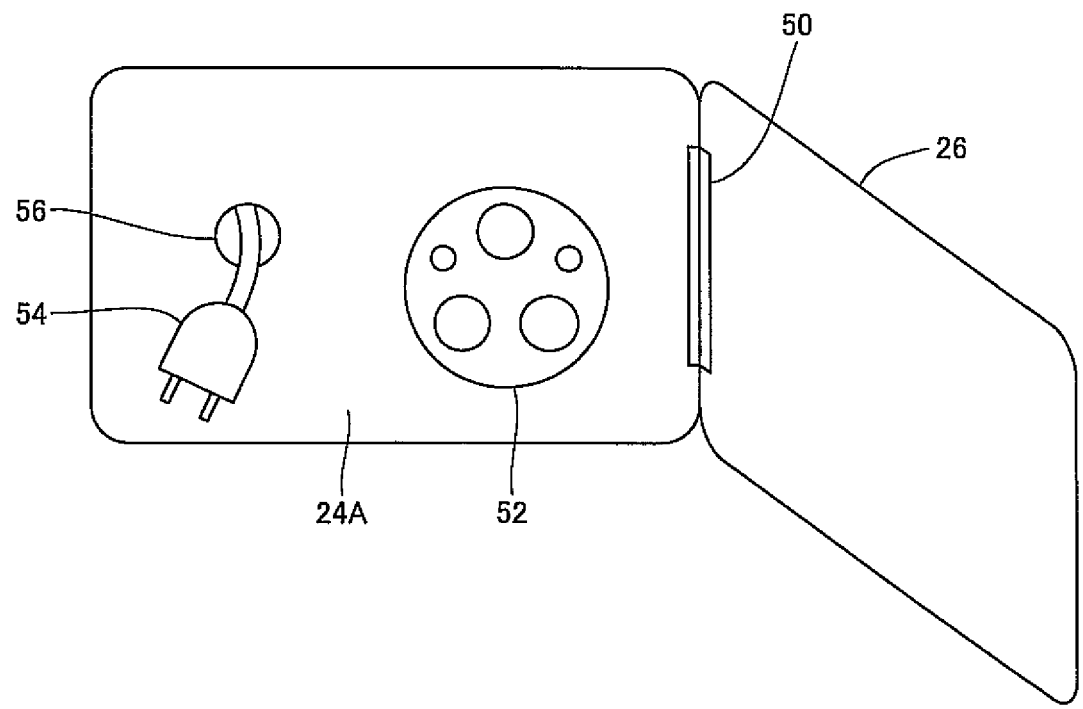
FIG. 5 is a diagram showing a schematic arrangement of a power receiving port in a second embodiment.

FIG. 5 is a diagram showing a schematic arrangement of a power receiving port in the second embodiment. With reference to FIG. 5, this power receiving port 24A is formed by removing selector switch 58 from the arrangement of power receiving port 24 in the first embodiment shown in FIG. 2.

Figure 6:
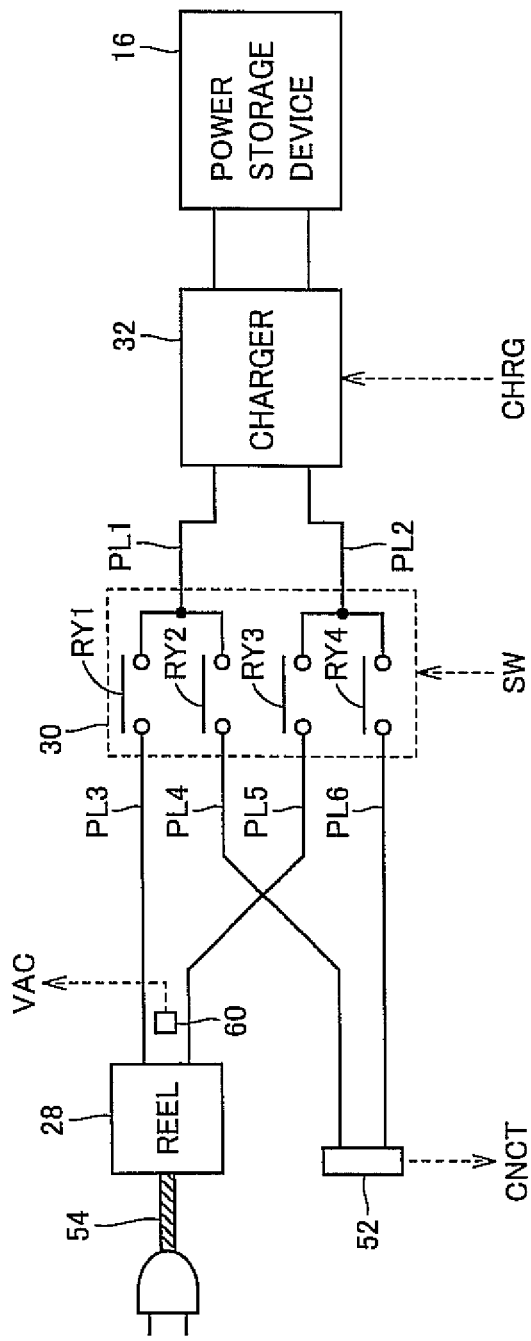
FIG. 6 is a diagram showing an arrangement of a charging route from the power receiving port to the power storage device in the second embodiment.

FIG. 6 is a diagram showing an arrangement of a charging route from power receiving port 24A to power storage device 16 in the second embodiment. With reference to FIG. 6, in the second embodiment, a voltage sensor 60 is further provided in the arrangement shown in FIG. 3. Voltage sensor 60 detects voltage VAC between power lines PL3 and PL5 to be connected to pullout type cord 54, and outputs a detected value thereof to charging ECU 34 (not shown).

When the charging cable (not shown) provided outside the vehicle is connected to inlet 52, connection signal CNCT to be output to charging ECU 34 (not shown) is activated. When the charging cable is not connected to inlet 52, connection signal CNCT is deactivated.

Figure 7:
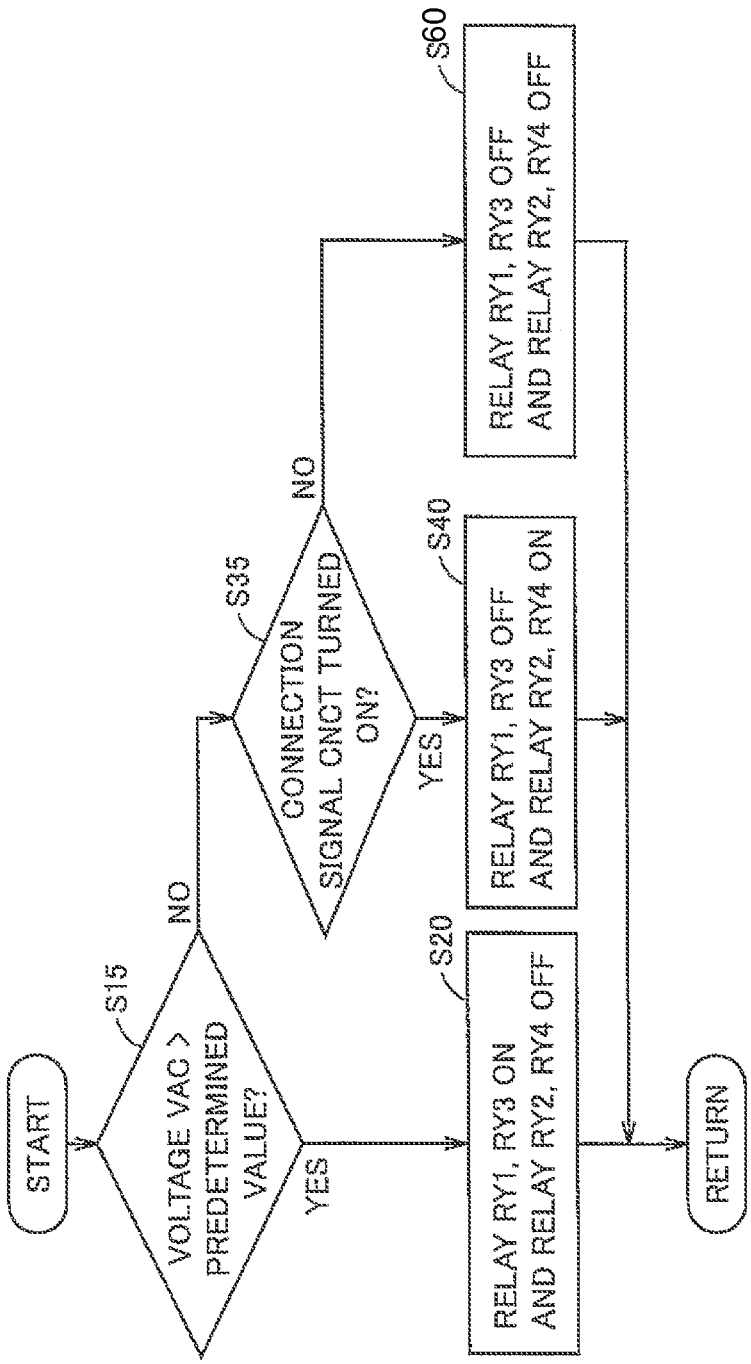
FIG. 7 is a flowchart for illustrating processing order of the charging ECU in the second embodiment regarding the switching of the use between the inlet and the pullout type cord.

FIG. 7 is a flowchart for illustrating processing order of charging ECU 34 in the second embodiment regarding the switching of the use between inlet 52 and pullout type cord 54. It should be noted that processing of this flowchart is also called from the main routine and executed at the fixed interval or at every time when the predetermined condition is satisfied.

With reference to FIG. 7, this flowchart does not include Step S50 in the flowchart shown in FIG. 4 but includes Steps S15 and S35 instead of Step S10 and S30 in FIG. 4. That is, charging ECU 34 firstly determines whether or not the detected value of voltage VAC from voltage sensor 60 (FIG. 6) is higher than a predetermined value (Step S15). It should be noted that this predetermined value is a threshold value for determining whether or not pullout type cord 54 is connected to the outside power source, and properly set in accordance with voltage of the outside power source.

When it is determined that voltage VAC is higher than the predetermined value (YES in Step S15), the processing proceeds to Step S20. In Step S20, relays RY1 and RY3 of switching unit 30 are turned ON and relays RY2 and RY4 are turned OFF. Thereby, pullout type cord 54 is electrically connected to charger 32.

Meanwhile, when it is determined that voltage VAC is not higher than the predetermined value in Step S15 (NO in Step S15), charging ECU 34 determines whether or not connection signal CNCT received from inlet 52 is turned ON (activated) (Step S35). When it is determined that connection signal CNCT is turned ON (YES in Step S35), it is determined that the charging cable is connected to inlet 52 and the processing proceeds to Step S40. In Step S40, relays RY1 and RY3 of switching unit 30 are turned OFF and relays RY2 and RY4 are turned ON. Meanwhile, when it is determined that connection signal CNCT is turned OFF (deactivated) in Step S35 (NO in Step S35), it is determined that the charging cable is not connected to inlet 52 and the processing proceeds to Step S60. In Step S60, relays RY1 to RY4 are turned OFF.

As described above, according to the second embodiment, since the selector switch to select whether to use inlet 52 or pullout type cord 54 is not required, cost can be reduced by the selector switch.

[Third Embodiment]

In a third embodiment, selector switch 58 is not required and voltage sensor 60 is also not required.

An entire arrangement of the hybrid vehicle according to the third embodiment is the same as the arrangement shown in FIG. 1. An arrangement of the power receiving port in the third embodiment is the same as power receiving port 24A shown in FIG. 5. Further, an arrangement of the charging route from the power receiving port to power storage device 16 in the third embodiment is the same as the arrangement shown in FIG. 3.

Figure 8:
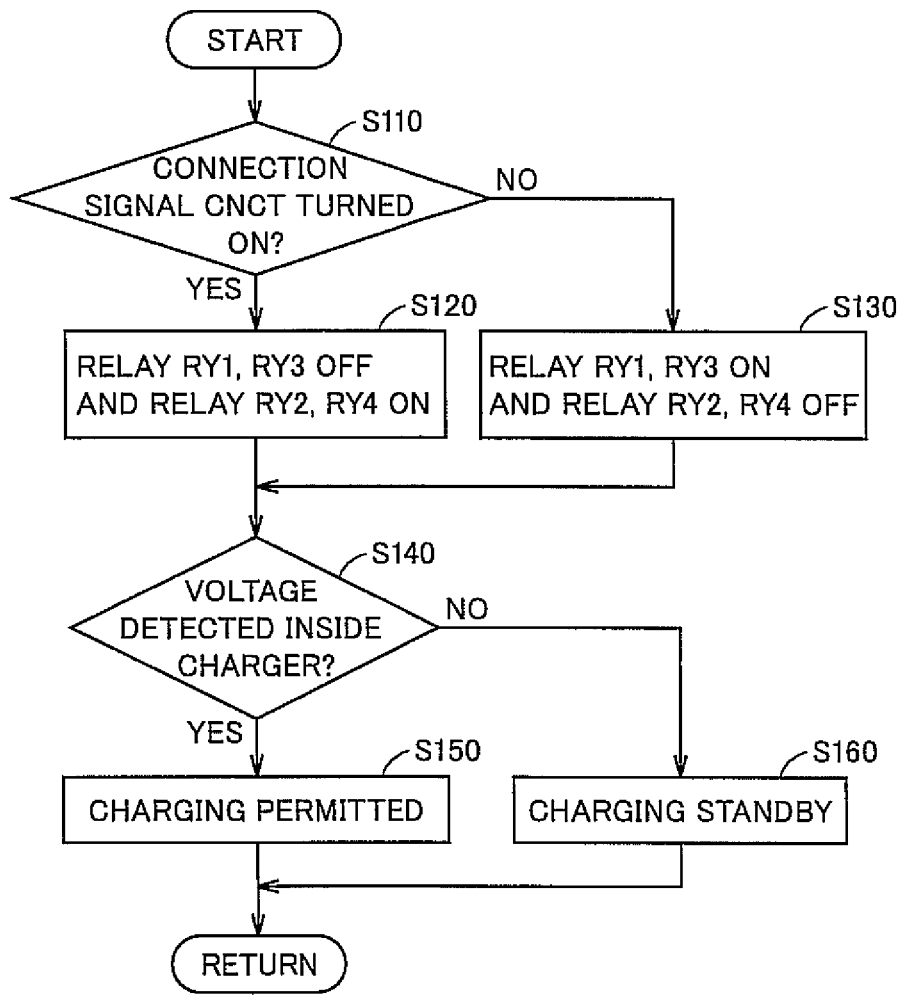
FIG. 8 is a flowchart for illustrating processing order of the charging ECU in the third embodiment regarding the switching of the use between the inlet and the pullout type cord.

FIG. 8 is a flowchart for illustrating processing order of charging ECU 34 in the third embodiment regarding the switching of the use between inlet 52 and pullout type cord 54. It should be noted that processing of this flowchart is also called from the main routine and executed at the fixed interval or at every time when the predetermined condition is satisfied.

With reference to FIG. 8, charging ECU 34 determines whether or not connection signal CNCT received from inlet 52 is turned ON (activated) (Step S110). When it is determined that connection signal CNCT is turned ON (YES in Step S110), it is determined that the charging cable is connected to inlet 52 and charging ECU 34 turns relays RY1 and RY3 of switching unit 30 OFF and turns relays RY2 and RY4 ON (Step S 120). Thereby, inlet 52 is electrically connected to charger 32 by switching unit 30.

Meanwhile, when it is determined that connection signal CNCT is turned OFF (deactivated) in Step S110 (NO in Step S110), it is determined that the charging cable is not connected to inlet 52 and charging ECU 34 turns relays RY1 and RY3 ON and turns relays RY2 and RY4 OFF (Step S130). Thereby, pullout type cord 54 is electrically connected to charger 32 by switching unit 30.

Charging ECU 34 then determines whether or not charging voltage is detected in the inside of charger 32 (Step S140). When it is determined that the charging voltage is detected in the inside of charger 32 (YES in Step S140), charger 32 is permitted to charge power storage device 16 (Step S150). Meanwhile, in a case where the charging voltage is not detected in the inside of charger 32 (NO in Step S140), charger 32 is held on standby for charging power storage device 16 (Step S160).

As described above, according to the third embodiment, since selector switch 58 is not required and voltage sensor 60 is also not required, the cost can be further reduced.

[Fourth Embodiment]

A fourth embodiment is another arrangement where selector switch 58 is not required and voltage sensor 60 is also not required.

An entire arrangement of the hybrid vehicle according to the fourth embodiment is the same as the arrangement shown in FIG. 1. An arrangement of the power receiving port in the fourth embodiment is the same as power receiving port 24A shown in FIG. 5.

Figure 9:
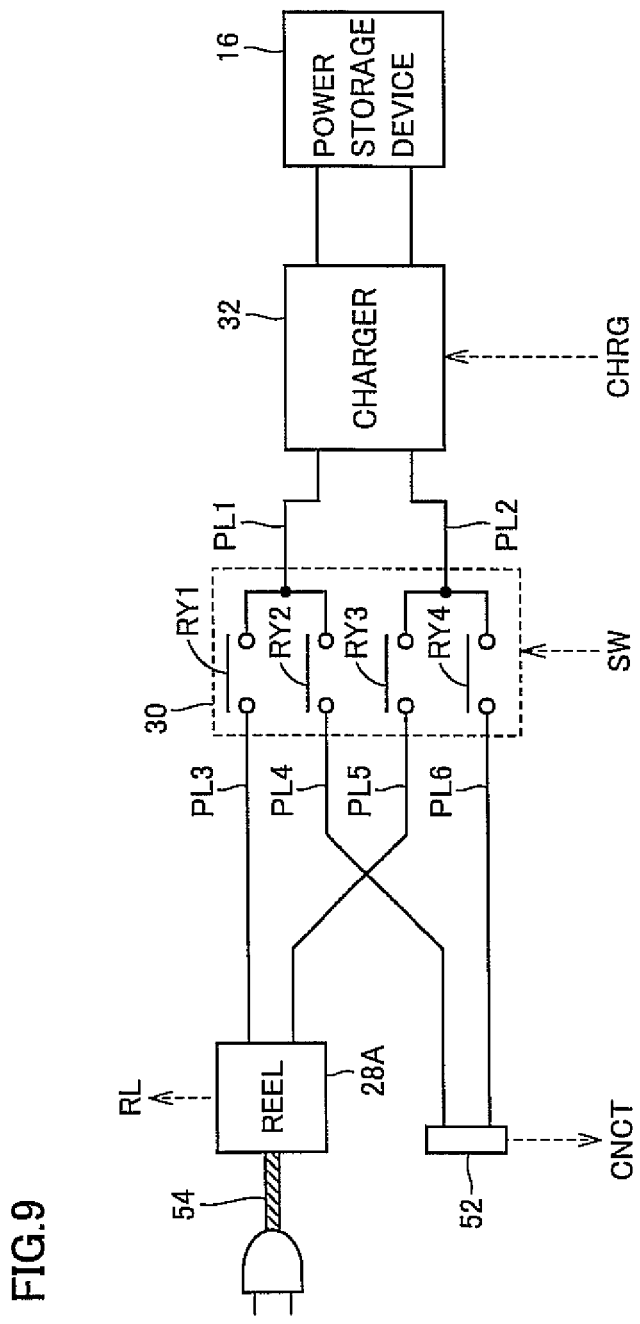
FIG. 9 is a diagram showing an arrangement of a charging route from the power receiving port to the power storage device in a fourth embodiment.

FIG. 9 is a diagram showing an arrangement of a charging route from the power receiving port to power storage device 16 in the fourth embodiment. With reference to FIG. 9, in the fourth embodiment, a cord reel 28A is provided in the arrangement shown in FIG. 3 instead of cord reel 28. When pullout type cord 54 is pulled out, cord reel 28A activates a signal RL to be output to charging ECU 34 (not shown).

Figure 10:
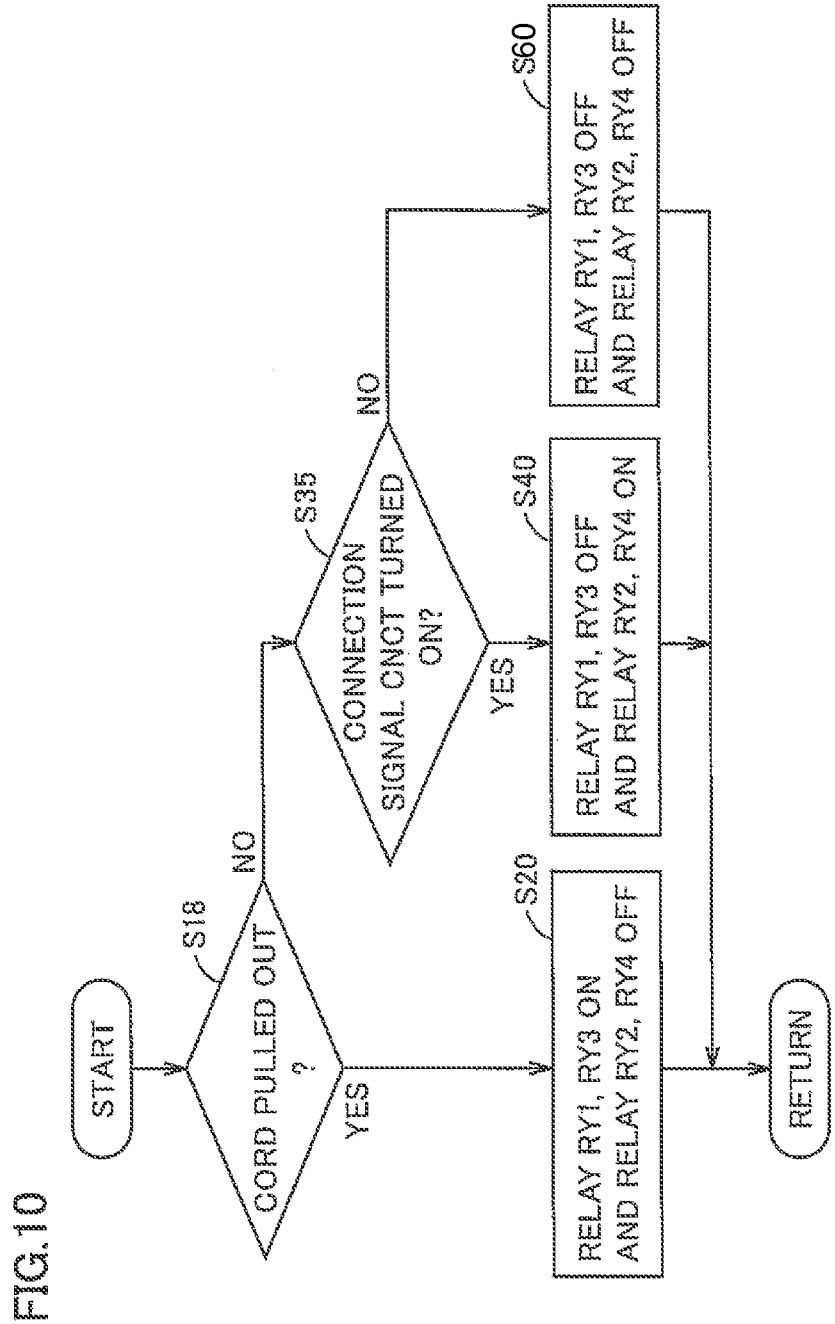
FIG. 10 is a flowchart for illustrating processing order of the charging ECU in the fourth embodiment regarding the switching of the use between the inlet and the pullout type cord.

FIG. 10 is a flowchart for illustrating processing order of charging ECU 34 in the fourth embodiment regarding the switching of the use between inlet 52 and pullout type cord 54. It should be noted that processing of this flowchart is also called from the main routine and executed at the fixed interval or at every time when the predetermined condition is satisfied.

With reference to FIG. 10, this flowchart includes Step S18 instead of Step S15 of the flowchart shown in FIG. 7. That is, charging ECU 34 firstly determines whether or not pullout type cord 54 is pulled out based on signal RL from cord reel 28A (Step S18).

When it is determined that pullout type cord 54 is pulled out (YES in Step S18), the processing proceeds to Step S20. In Step S20, relays RY1 and RY3 of switching unit 30 are turned ON and relays RY2 and RY4 are turned OFF. Thereby, pullout type cord 54 is electrically connected to charger 32.

Meanwhile, when it is determined that pullout type cord 54 is not pulled out in Step S18 (NO in Step S18), the processing proceeds to Step S35. In Step S35, it is determined whether or not connection signal CNCT received from inlet 52 is turned ON (activated).

As described above, according to the fourth embodiment as well, since selector switch 58 is not required and voltage sensor 60 is not required, the cost can be further reduced.

[Fifth Embodiment]

In a fifth embodiment, a display for showing whether inlet 52 or pullout type cord 54 is being used at the time of charging power storage device 16 (FIG. 1) from the outside power source is provided.

An entire arrangement of the hybrid vehicle according to the fifth embodiment is the same as the arrangement shown in FIG. 1.

Figure 11:
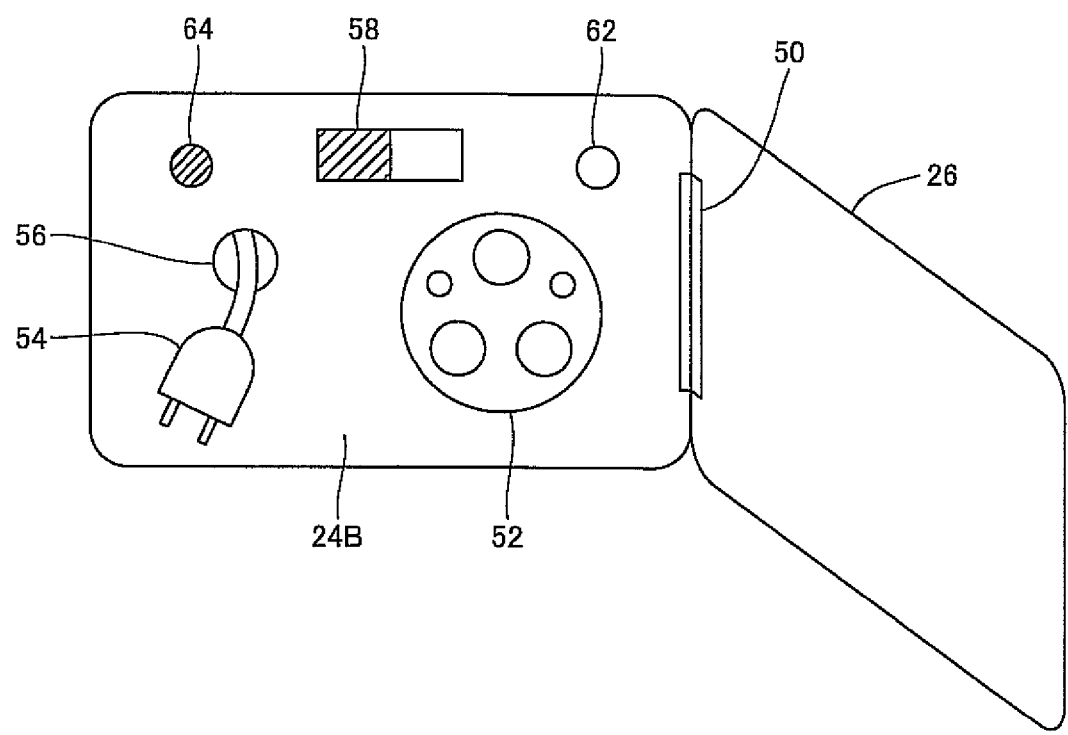
FIG. 11 is a diagram showing a schematic arrangement of a power receiving port in a fifth embodiment.

FIG. 11 is a diagram showing a schematic arrangement of a power receiving port in the fifth embodiment. With reference to FIG. 11, this power receiving port 24B is formed by further providing displays 62 and 64 in the arrangement of power receiving port 24 in the first embodiment shown in FIG. 2.

Displays 62 and 64 are formed of LED (Light Emitting Diode) for example for displaying that either inlet 52 or pullout type cord 54 is being used. Specifically, displays 62 and 64 are respectively provided on the side of inlet 52 and the side of pullout hole 56. When selector switch 58 is on the side of inlet 52, display 62 is blinked. When the charging from inlet 52 is actually being carried out, display 62 is lit. When selector switch 58 is on the side of pullout type cord 54, display 64 is blinked. When the charging from pullout type cord 54 is actually being carried out, display 64 is lit.

Figure 12:
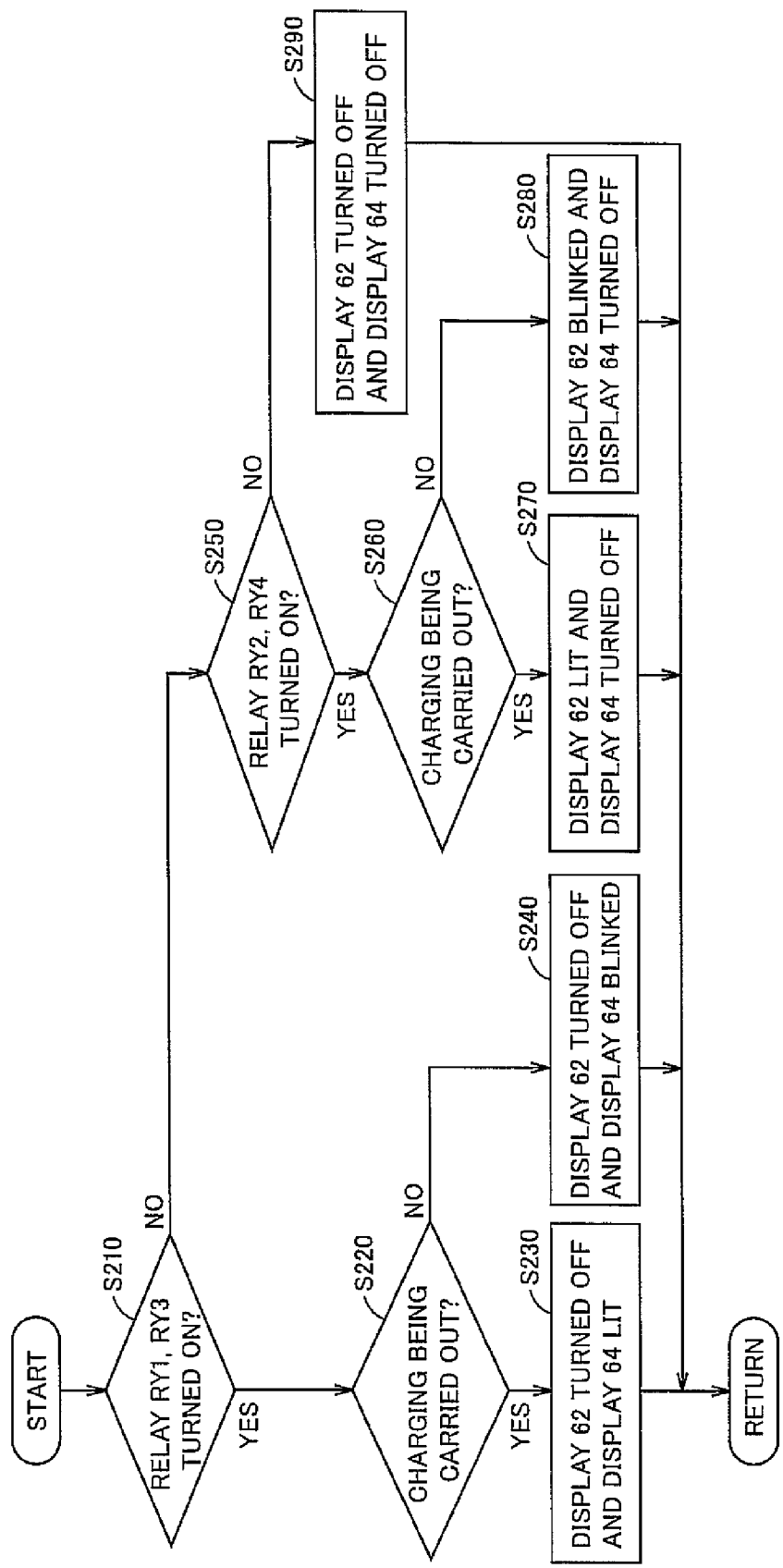
FIG. 12 is a flowchart for illustrating display processing order of the charging ECU in the fifth embodiment regarding displays.

FIG. 12 is a flowchart for illustrating display processing order of charging ECU 34 in the fifth embodiment regarding displays 62 and 64. It should be noted that processing of this flowchart is also called from the main routine and executed at the fixed interval or at every time when the predetermined condition is satisfied.

With reference to FIG. 12, charging ECU 34 determines whether or not relays RY1 and RY3 of switching unit 30 are turned ON (Step S210). When it is determined that relays RY1 and RY3 are turned ON (YES in Step S210), charging ECU 34 determines whether or not the charging from pullout type cord 54 is actually being carried out (Step S220). It is possible to determine whether or not the charging is actually being carried out based on detected values of a voltage sensor, a current sensor and the like provided in charger 32.

When it is determined that the charging is being carried out (YES in Step S220), charging ECU 34 turns off display 62 and lights display 64 (Step S230). Meanwhile, when it is determined that the charging is not being carried out in Step S220 (NO in Step S220), charging ECU 34 turns off display 62 and blinks display 64 (Step S240).

When it is determined that relays RY1 and RY3 are not turned ON in Step S210 (NO in Step S210), charging ECU 34 determines whether or not relays RY2 and RY4 of switching unit 30 are turned ON (Step S250). When it is determined that relays RY2 and RY4 are turned ON (YES in Step S250), charging ECU 34 determines whether or not the charging from inlet 52 is actually being carried out (Step S260). It is also possible to determine whether or not the charging is actually being carried out based on the detected values of the voltage sensor, the current sensor and the like provided in charger 32.

When it is determined that the charging is being carried out (YES in Step S260), charging ECU 34 lights display 62 and turns off display 64 (Step S270). Meanwhile, when it is determined that the charging is not being carried out in Step S260 (NO in Step S260), charging ECU 34 blinks display 62 and turns off display 64 (Step S280).

When it is determined that relays RY2 and RY4 are not turned ON in Step S250 (NO in Step S250), charging ECU 34 turns off both displays 62 and 64 (Step S290).

It should be noted that although displays 62 and 64 are provided in the arrangement of the first embodiment above, displays 62 and 64 may be provided in the arrangement of the second to fourth embodiments.

As described above, according to the fifth embodiment, the user can easily recognize that either inlet 52 or pullout type cord 54 is being used for charging power storage device 16 (FIG. 1) from the outside power source.

Figure 13:
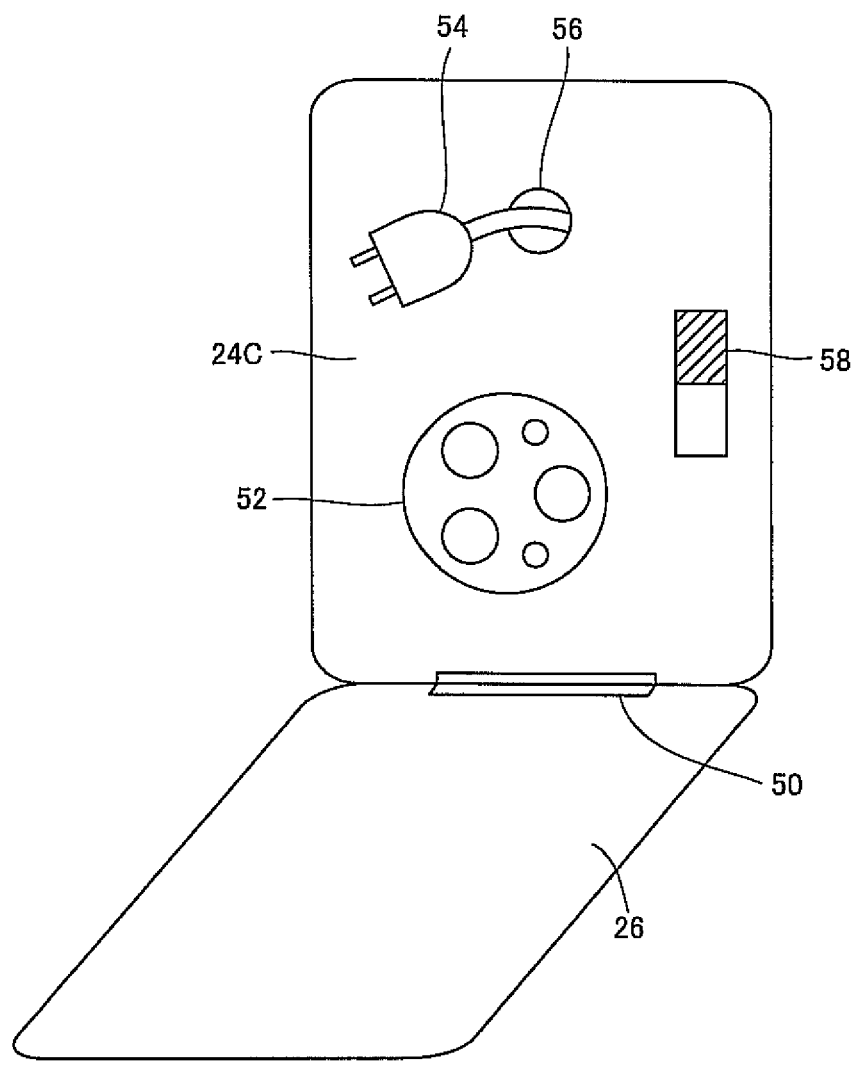
FIG. 13 is a diagram showing another example of the power receiving port and the lid.

It should be noted that although lid 26 opens to the right in the embodiments above, the opening direction of lid 26 is not limited to the right. For example, lid 26 may open to the lower side as shown in FIG. 13. In this case, pullout hole 56 for pullout type cord 54 is provided on the upper side of inlet 52 (the opening side of lid 26).

Although power storage device 16 is charged from the outside power source by exclusive charger 32 above, the charging method of power storage device 16 from the outside power source is not limited to such a method. For example, power lines PL1 and PL2 connected to switching unit 30 may be respectively connected to neutral points of motor generators 6 and 10 and the electric power given from the outside power source to the neutral points of motor generators 6 and 10 may be converted by power converters 18 and 20 so as to charge power storage device 16.

A series/parallel type hybrid vehicle capable of dividing the mechanical power of engine 2 by power split device 4 and transmitting the power to drive shaft 12 and motor generator 6 is described in the embodiments above. However, this invention can be applied to other type of hybrid vehicle. For example, this invention can also be applied to a series type hybrid vehicle of using engine 2 only for driving motor generator 6 and generating the drive force of the vehicle only by motor generator 10, a hybrid vehicle of collecting only regenerative energy among the motion energy generated by engine 2 as the electric energy, a motor-assisting hybrid vehicle taking the engine as major mechanical power with assistance of the motor according to need, and the like.

This invention can also be applied to an electric vehicle travelling by the electric power without engine 2, a fuel cell vehicle provided with a fuel cell as the DC power source in addition to power storage device 16, and the like. This invention can also be applied to an electric-powered vehicle provided with a boost converter between power storage device 16 and power converters 18 and 20.

It should be noted that inlet 52 corresponds to a "power receiving inlet" in this invention, and pullout type cord 54 corresponds to a "power receiving cord" in this invention. Selector switch 58 corresponds to a "switch" in this invention, and charging ECU 34 corresponds to a "determiner" in this invention. Further, cord reel 28A corresponds to a "detector" in this invention.

The embodiments disclosed herein should be regarded as not limitation but an example in all aspects. A scope of the present invention is shown by not the embodiments above but claims. The present invention should include all variations within similar meanings and ranges to the claims.

REFERENCE SIGNS LIST

2: Engine, 4: Power split device, 6, 10: Motor generator, 8: Transmission gear, 12: Drive shaft, 14: Wheel, 16: Power storage device, 18, 20: Power converter, 22: ECU, 24, 24A, 24B: Power receiving port, 26: Lid, 28, 28A: Cord reel, 30: Switching unit, 32: Charger, 34: Charging ECU, 50: Joint, 52: Inlet, 54: Pullout type cord, 56: Pullout hole, 58: Selector switch, 60: Voltage sensor, 62, 64: Display, 100: Hybrid vehicle, RY1 to RY4: Relay, PL1 to PL6: Power line

The invention claimed is:

1. An electric-powered vehicle having a rechargeable power storage device chargeable from a power source outside the vehicle, comprising:
a power receiving inlet connectable with a charging cable provided outside the vehicle;
a pullout type power receiving cord connectable to a socket of said power source;
a power receiving port having said power receiving inlet and a pullout hole for pulling out said power receiving cord formed thereon; and
a lid of said power receiving port, wherein
in said power receiving port, said pullout hole is provided at a position where a distance between the pullout hole and a joint openably combining said lid with said power receiving port is more than a distance between said power receiving inlet and the joint.

2. The electric-powered vehicle according to claim 1, wherein
said power receiving inlet and said pullout hole are respectively provided on the side where said joint is provided and the side opposing to the side where said joint is provided in said power receiving port.

3. The electric-powered vehicle according to claim 1, wherein
said power receiving cord or said power receiving inlet is selectively used at the time of charging said power storage device from said power source.

4. The electric-powered vehicle according to claim 3, further comprising:
a switch for selecting whether to use said power receiving inlet or said power receiving cord at the time of charging said power storage device from said power source.

5. The electric-powered vehicle according to claim 4, wherein
said switch is provided in said power receiving port.

6. The electric-powered vehicle according to claim 3, further comprising:
a voltage sensor for detecting voltage of said power receiving cord; and
a determiner for determining whether to use said power receiving inlet or said power receiving cord at the time of charging said power storage device from said power source based on a detected value of said voltage sensor and a connection signal indicating connection between said charging cable and said power receiving inlet.

7. The electric-powered vehicle according to claim 3, further comprising:
a detector for detecting pullout of said power receiving cord from said pullout hole; and
a determiner for determining whether to use said power receiving inlet or said power receiving cord at the time of charging said power storage device from said power source based on a detection result of said detector and a connection signal indicating connection between said charging cable and said power receiving inlet.

8. The electric-powered vehicle according to claim 3, further comprising:
a display for displaying whether said power receiving inlet or said power receiving cord is being used.

* * * * *